A. R. ARNOT.
SHOCK ABSORBER.
APPLICATION FILED OCT. 14, 1920.
1,413,451. Patented Apr. 18, 1922.
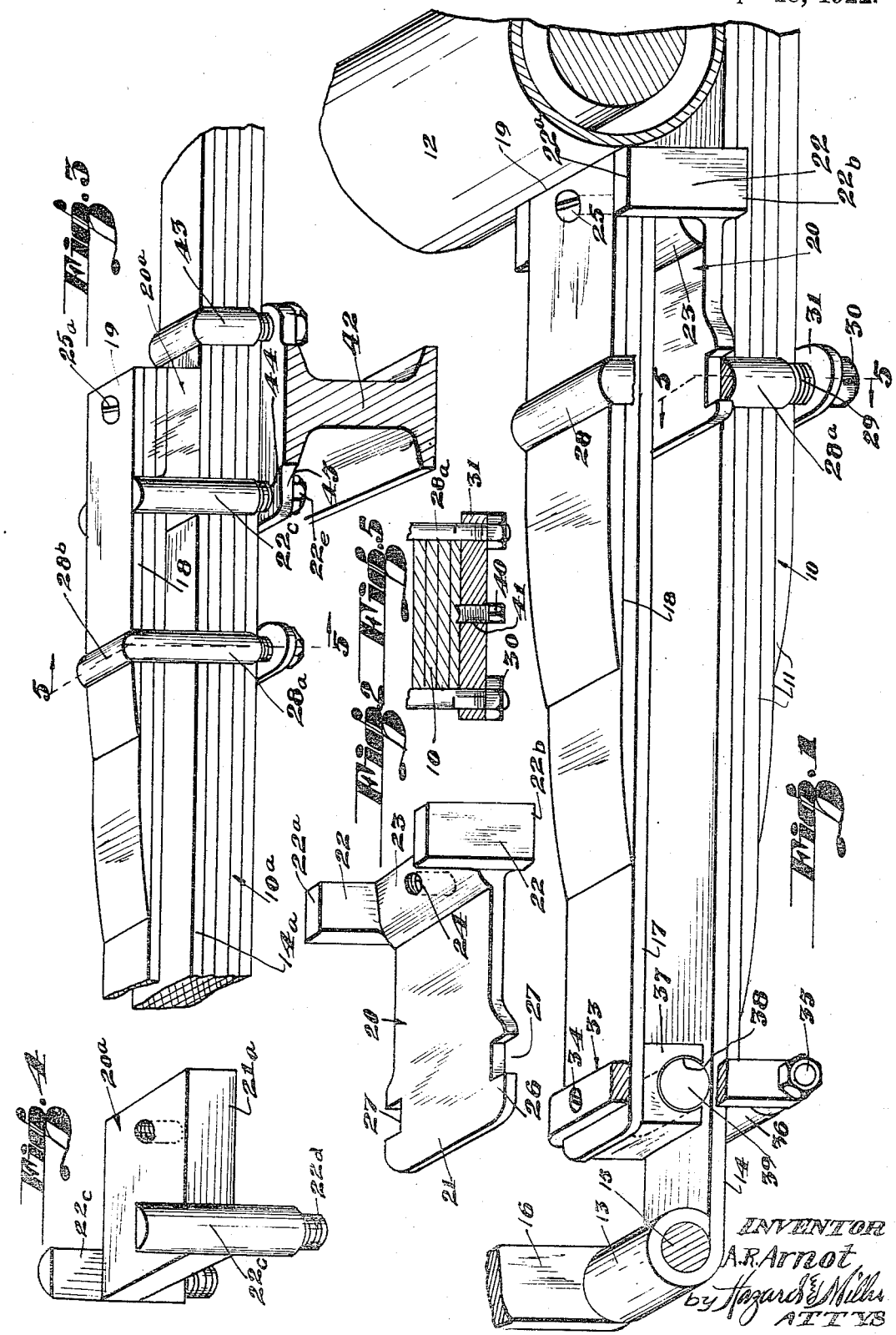

UNITED STATES PATENT OFFICE.

ALEXANDER R. ARNOT, OF LOS ANGELES, CALIFORNIA.

SHOCK ABSORBER.

1,413,451.  Specification of Letters Patent.  Patented Apr. 18, 1922.

Application filed October 14, 1920. Serial No. 416,798.

*To all whom it may concern:*

Be it known that I, ALEXANDER R. ARNOT, a citizen of the United States, residing at Los Angeles, in the county of Los Angeles and State of California, have invented new and useful Improvements in Shock Absorbers, of which the following is a specification.

This invention relates to shock absorbers, and particularly to a device adapted to be secured to the body supporting springs of a vehicle, for the purpose of acting as a rebound stop, and it is an improvement over my invention of a similar device, shown and described in an application for United States Letters Patent, filed November 7, 1919, Serial Number 336,389.

The principal object of my invention is the provision of a simple and efficient shock absorber, which may be readily applied to the supporting springs of any standard vehicle, equipped with what are commonly known as elliptical or leaf springs.

My device comprises essentially a resilient element, consisting of one or more spring leaves, suitably mounted on the upper side of the lower spring members or the under side of the upper members, in a spring organization, to act as a rebound stop, and also to act as a cushion for all vertical movements of the spring unit to which it is secured.

A further object is the provision of a device of this character, which will not only act to absorb the rebound, and cushion violent downward movements of the elements to which it is attached, but by reason of the particular principle involved in its construction, it exerts a downward pressure upon the wheels, causing them to hold the road, during the rebound.

My present invention differs from my former invention, as set forth in the aforementioned application for Letters Patent, in that the said former invention involves the principle of a lever of the first class, while the present invention operates on the theory of a lever of the third class.

The particular merits of my present invention will be more fully set forth in the following specification, reference being had to the accompanying drawings in which I have illustrated the preferred form, and in which:

Figure 1 is a perspective view of my invention as applied to a typical rear elliptic spring, portions being broken away to show details of construction.

Fig. 2 being a perspective view of the securing plate.

Fig. 3 is a fragmentary perspective view showing a modified form of my invention as applied to a front spring.

Fig. 4 is a perspective view of the modified form of securing plate shown in Fig. 3.

Fig. 5 is a fragmentary transverse vertical section taken as indicated by the line 5—5 of Fig. 3 and showing the means of securing adjusting clip in place.

In the drawings the numeral 10 designates a portion of a typical lower spring element of an elliptical or leaf spring organization, the said element consisting of a plurality of superposed leaves 11, secured to the rear axle 12, by any suitable means. The outer end of the element 10 has an eye 13 formed in the extremity of the top leaf 14, through which passes a pin 15 forming a part of a shackle 16. The shackle 16 may connect the lower spring elements 10 directly with the vehicle body, or may connect it with a complementary spring element, which is secured to the vehicle body, or any other suitable form of attachment.

In the construction of vehicles, and especially motor vehicles, to which my invention will doubtless have its widest application, various forms of supporting springs are used. Springs such as those shown in the drawings, and known as elliptical springs, are most common; and consist of the several types generally known as semi-elliptical, three-quarters elliptical and full elliptical. There is also another type of spring quite generally used, known as the cantilever spring which is constructed of superposed leaves, in the manner similar to elliptical springs, with the exception that one end is secured to the vehicle body and the opposite end is secured to the axle or running gear. My invention is applicable alike to all these types of springs, to the upper side of the lower spring element; and in the case of cantilever springs to the under side, or adjacent the main supporting springs.

My invention comprises essentially a resilient shock-absorbing element consisting of a main or supporting spring 17 and one or more secondary springs 18, the number of the latter depending entirely on the weight of the vehicle and the load it is designed to carry. The main spring 17 together with the secondary springs 18 are placed from the upper leaf 14, of the spring element 10, as clearly shown in Fig. 1, the rear ends 19 abutting against the axle housing 12, and supported on a bearing plate 20.

The bearing plate 20 consists of a horizontal bearing portion 21 having a pair of lugs 22 secured to one end and preferably formed integral therewith. The bearing portion 21 is of any suitable length, and of a width equal to the width of the leaves composing the spring element 10. The lugs 22 extend upwardly at right angles to the portion 21, and are spaced apart a distance equal to the width of the spring leaves 14 and 17 and 18. The top portions $22^a$ form bearings to prevent lateral displacement of the spring elements 17 and 18, and the lower depending portions $22^b$ extending below the portion 21, are adapted to fit over the sides of the spring leaf 14, to prevent lateral displacement of the whole bearing plate 20. A raised portion or base 23, formed integral with the members 21 and 22, extends across the plate 21 between the lugs 22, to form a raised bearing surface for the ends 19 of the springs 17 and 18, to hold them in spaced relation with the leaf 14 of the spring element 10. The base 23 has a bore 24 internally threaded to receive a cap screw 25, extending through the spring leaves 17 and 18, to prevent longitudinal displacement of the latter.

The plate 21 is widened on either side as at 26, the widened portions being recessed as at 27 to receive the clip 28. The lateral distance between the inner faces of the recesses 27, is equal to the width of the spring leaves, in order that the clip 28 may fit closely about them and securely hold them in proper relation.

The clip 28 is of a U-shaped configuration, and adapted to fit closely around the spring elements 17 and 18, and the element 10; the extremities of the arms $28^a$ being reduced as at 29 and screw-threaded to receive nuts 30. A transverse clamping plate 31 has bars 32 in each end to fit over the reduced portions 29, and is adapted to be held rigidly in place against the element 10 by the nuts 30. The function of the clip 28 will be hereinafter fully explained.

A U-shaped member clip 33 is adapted to fit over the outer end of the leaf 17, and extend downwardly over the leaf 14 of the element 10, and is secured to the leaf 17 by means of a screw 34, or any other suitable means, to prevent longitudinal movement thereon. The ends of the arms of the member 33 are bored to receive a transverse bolt 35, on which is a spacer 36, consisting of a piece of tubing or the like, to hold the arms in properly spaced relation and to provide an anti-friction bearing for contact with the leaf 14.

A bearing block 37, having a transverse semi-circular recess 38, extends transversely between the depending arms of the clip 33, and between the spring leaves 14 and 17. The screw 34 is also tapped into the block 37, for holding it immovable relative to the leaf 17. An anti-friction roller 39 is loosely mounted in the recess 38, and is held against longitudinal displacement by the arms of the clip 33. The recess 38 is formed so that it extends down below the center of the roller 39, and so that the periphery of the roller, when inserted therein, will extend down below the bottom side to freely engage the leaf 14. The peripheries of the roller 39 and the spacer 36 are spaced slightly greater than the thickness of the leaf 14, so that during downward movement of the element 10 the spacer 36 will contact with the under face of the leaf 14, and during the upward movement, or rebound, the roller 39 will contact with the upper face.

The springs 17 and 18, and bearing plate 20, are securely held in place against the axle housing 12, by means of a cap screw 40, extending through an internally threaded bore 41 in the plate 31, the screw 40 also being tapped into the lower leaf 11 of the spring element 10, to prevent longitudinal displacement of the shock absorbing element.

In the modified form of my device, as shown in Figs. 3 and 4, the bearing plate $20^a$ consists of a bearing portion $21^a$, having vertically extending lugs $22^c$. The lower depending portions of the lugs $22^c$ are reduced as at $22^d$ and screw-threaded to receive nuts $22^e$. The ends 19 of the leaf springs 17 and 18 are adapted to be mounted just over the front axle 43, the lugs $22^c$ acting as one of the spring clips 43. The reduced portions $22^d$ of the lugs $22^c$ are adapted to extend through bores 44 in ears 45 of the axle 42. The bearing portion of the plate $20^a$ is of a thickness of the desired space between the spring element $10^a$ and the leaf 17; and a cap screw $25^a$ extends through the leaves 17 and 18 and is tapped into the plate $21^a$, to secure the said leaves against longitudinal movement. The clip $28^b$, is the same in all essentials as the clip 28, and is adapted to accomplish the same purpose. The outer end of the leaf 17 is supported relative to the leaf $14^a$ in the same manner as shown in Fig. 1.

In the operation of my device when the wheels of the vehicle strike a bump or a rut, the wheels are naturally thrown upwardly towards the body, which results in compression of the spring elements, that is, in case of full elliptic springs the top and bottom elements of such spring organizations come together. After thus coming together the resilience of the springs reacts to force them apart, which causes what is known as the rebound. During the downward or compression movement of the spring the lower leaf 17 will be carried downwardly with it at its outer end, by the clip 33, with no effect upon the movement of the spring element 10, other than a slight longitudinal relative movement between the two. During the upward movement or rebound of the element 10 the spring leaves 17 and 18 will exert a downward pressure against the leaf 14 at the outer end, or at its point of attachment by the clip 33. During this movement the anti-friction roller 39 will permit a limited longitudinal relative movement between the leaves 14 and 17, without lessening the pressure exerted by the leaves 17 and 18.

The extent of pressure exerted against the upper side of the spring element 10, during this rebound action, may be varied to suit conditions, by tightening the clip 28 about the element 10 and the leaves 17 and 18. The ends 19 of the leaves 17 and 18 being rigidly supported by the support 24 on the plate 21, and the outer end of the leaf 17 being supported by the clip 33, any desired pressure may be exerted on the element 10 by the outer end of the leaf 17, by adjustment of the clip 28.

While I have here shown and described the principal embodiment of my invention, it is understood that I reserve the right to make any changes or modifications in structure which properly come within the scope of the appended claims.

Having described my invention, I claim:

1. A shock absorber for vehicles having leaf springs, comprising a supporting plate mounted on top of the lower element of said springs adjacent the axle, a plurality of superposed leaf springs mounted with one end supported on said plate and spaced from said element thereby, the opposite ends of said springs extending over said element, a clip pivotally secured to the outer end of said element and providing an anti-friction bearing for the outer end of the lower leaf spring, a second clip intermediate said plate and the first mentioned clip and extending around the spring element and the leaf springs to adjust the compression of the latter, and means to prevent longitudinal displacement of the leaf springs.

2. A shock absorber for vehicles having leaf springs, comprising a plurality of superposed leaf springs of successively shorter lengths extending over the lower element of said vehicle springs, a spacing plate adjacent the vehicle axle for supporting one end of the superposed leaf springs, a clip around the opposite ends of the leaf springs and the said elements, said clip providing an anti-friction bearing between said springs and an adjustable clip around said leaf springs and said element intermediate the supporting plate and the first mentioned clip, and means to prevent lateral and longitudinal displacement of the superposed leaf springs.

3. A shock absorber for vehicles having leaf springs, comprising a main leaf spring and a plurality of successively shorter similar springs superposed thereon extending over the lower element of said vehicle springs, a spacing plate adjacent the point of attachment of the lower element for supporting one end of the superposed leaf springs, a clip around the opposite end of the leaf springs and the said element, and an adjustable clip around said leaf springs and said element intermediate the supporting plate and the first mentioned clip, and means to prevent lateral and longitudinal displacement of the leaf springs.

4. A shock absorber for vehicles having leaf springs, comprising a shock abosrbing element mounted over the lower vehicle spring element, said shock absorbing element consisting of one or more leaf springs, a spacing plate on the lower element adjacent its point of attachment to the axle for supporting one end of the shock absorbing element, a clip around the opposite end of the shock absorbing element and the lower element, said clip providing an anti-friction bearing between the two, an adjustable clip around said element intermediate the spacing plate and the first mentioned clip, and means to prevent longitudinal displacement of the shock absorbing element.

5. A shock absorber for vehicles having leaf springs, comprising a supporting plate mounted on top of the lower element of said springs adjacent to the axle, a plurality of superposed leaf springs mounted with one end supported on said plate and spaced from said element thereby, the opposite ends of said springs extending over said element, a clip pivotally secured to the outer end of said element and providing an anti-friction bearing for the outer end of the lower leaf spring, and a second clip intermediate said plate and the first mentioned clip and extending around the spring element and the leaf springs to adjust the compression of the latter.

In testimony whereof I have signed my name to this specification.

A. R. ARNOT.